(12) United States Patent
Bryant et al.

(10) Patent No.: US 8,543,295 B2
(45) Date of Patent: Sep. 24, 2013

(54) ELECTRONICALLY CONTROLLED SPEED LIMITING SYSTEM FOR TURF CARE MACHINE

(76) Inventors: Christian Stanton Carver Bryant, Charlotte, NC (US); Bryan E. Holby, Charlotte, NC (US); Lynn G. Westbrook, Lake Wylie, SC (US); Brian Melka, Lake Wylie, SC (US)

(*) Notice: Subject to any disclaimer, the term of this patent is extended or adjusted under 35 U.S.C. 154(b) by 441 days.

(21) Appl. No.: 12/955,983

(22) Filed: Nov. 30, 2010

(65) Prior Publication Data

US 2012/0136539 A1    May 31, 2012

(51) Int. Cl.
*G06F 19/00*    (2011.01)

(52) U.S. Cl.
USPC .................................. 701/42; 701/70; 701/71

(58) Field of Classification Search
USPC ............................................... 701/42, 70–71
See application file for complete search history.

(56) References Cited

U.S. PATENT DOCUMENTS

| | | |
|---|---|---|
| 3,742,685 A | 7/1973 | Lian et al. |
| 3,771,296 A | 11/1973 | Sorenson et al. |
| 3,816,985 A | 6/1974 | Sorenson et al. |
| 3,824,772 A | 7/1974 | Sorenson et al. |
| 3,832,835 A | 9/1974 | Hall et al. |
| 3,885,375 A | 5/1975 | Solterbeck |
| 3,999,359 A | 12/1976 | Jordan et al. |
| 4,009,556 A | 3/1977 | Molzahn |
| 4,192,124 A | 3/1980 | Balthes |
| 4,458,471 A | 7/1984 | Herwig |
| 4,919,224 A | 4/1990 | Shyu et al. |
| 4,934,985 A | 6/1990 | Strubbe |
| 4,967,544 A | 11/1990 | Ziegler et al. |
| 4,995,227 A | 2/1991 | Foster |
| 5,007,234 A | 4/1991 | Shurman et al. |
| 5,394,678 A | 3/1995 | Lonn et al. |
| 5,430,997 A | 7/1995 | O'Halloran et al. |
| 5,497,604 A | 3/1996 | Lonn |
| 5,657,224 A | 8/1997 | Lonn et al. |
| 5,744,701 A | 4/1998 | Peterson et al. |
| 5,921,070 A | 7/1999 | Chamberlain |
| 5,995,895 A | 11/1999 | Watt et al. |
| 6,116,005 A | 9/2000 | Chamberlain |
| 6,119,442 A | 9/2000 | Hale |
| 6,167,685 B1 | 1/2001 | Berger et al. |

(Continued)

OTHER PUBLICATIONS

Sauer Danfoss "Series 40 Axial Piston Pumps Technical Information", pp. 47-49, Jun. 2009.

(Continued)

*Primary Examiner* — Hussein A. Elchanti
(74) *Attorney, Agent, or Firm* — Harness, Dickey & Pierce, P.L.C.

(57) ABSTRACT

An electronically controlled speed limiting system for a turf maintenance machine includes at least one traction motor rotating a wheel. At least one hydraulic pump in fluid communication with the traction motor provides hydraulic fluid to operate the traction motor. At least one actuator in fluid communication with the hydraulic pump varies an output of the hydraulic pump. A controller in communication with the actuator commands the actuator to control the output of the hydraulic pump and thereby an operating speed of the wheel. A brake is activated by the controller if a wheel speed sensor signals the wheel is slip-spinning, to mitigate turf damage. A steering position sensor signal is used by the controller to modify brake activation during machine turns. An inclinometer signal is used by the controller to automatically reduce machine speed on inclined surfaces.

22 Claims, 6 Drawing Sheets

(56) References Cited

U.S. PATENT DOCUMENTS

| | | |
|---|---|---|
| 6,230,089 B1 | 5/2001 | Lonn et al. |
| 6,431,981 B1 | 8/2002 | Shinners et al. |
| 7,017,327 B2 * | 3/2006 | Hunt et al. ............... 56/14.7 |
| 2001/0042362 A1 | 11/2001 | Scarlett et al. |
| 2005/0126145 A1 * | 6/2005 | Hunt et al. ............... 56/11.9 |
| 2006/0096266 A1 * | 5/2006 | Dettmann ............... 56/11.9 |
| 2007/0295545 A1 * | 12/2007 | Romig et al. ............ 180/197 |
| 2008/0289309 A1 * | 11/2008 | Gust et al. ............... 56/11.9 |
| 2009/0192691 A1 * | 7/2009 | O'Connor et al. ........ 701/90 |
| 2009/0235627 A1 | 9/2009 | Silbernagel et al. |
| 2010/0253271 A1 | 10/2010 | Godbold et al. |

OTHER PUBLICATIONS

Sauer Danfoss "TMK, TMKW and TMK FL Orbital Motors" Technical Information, pp. 1-27, Mar. 2010.

* cited by examiner

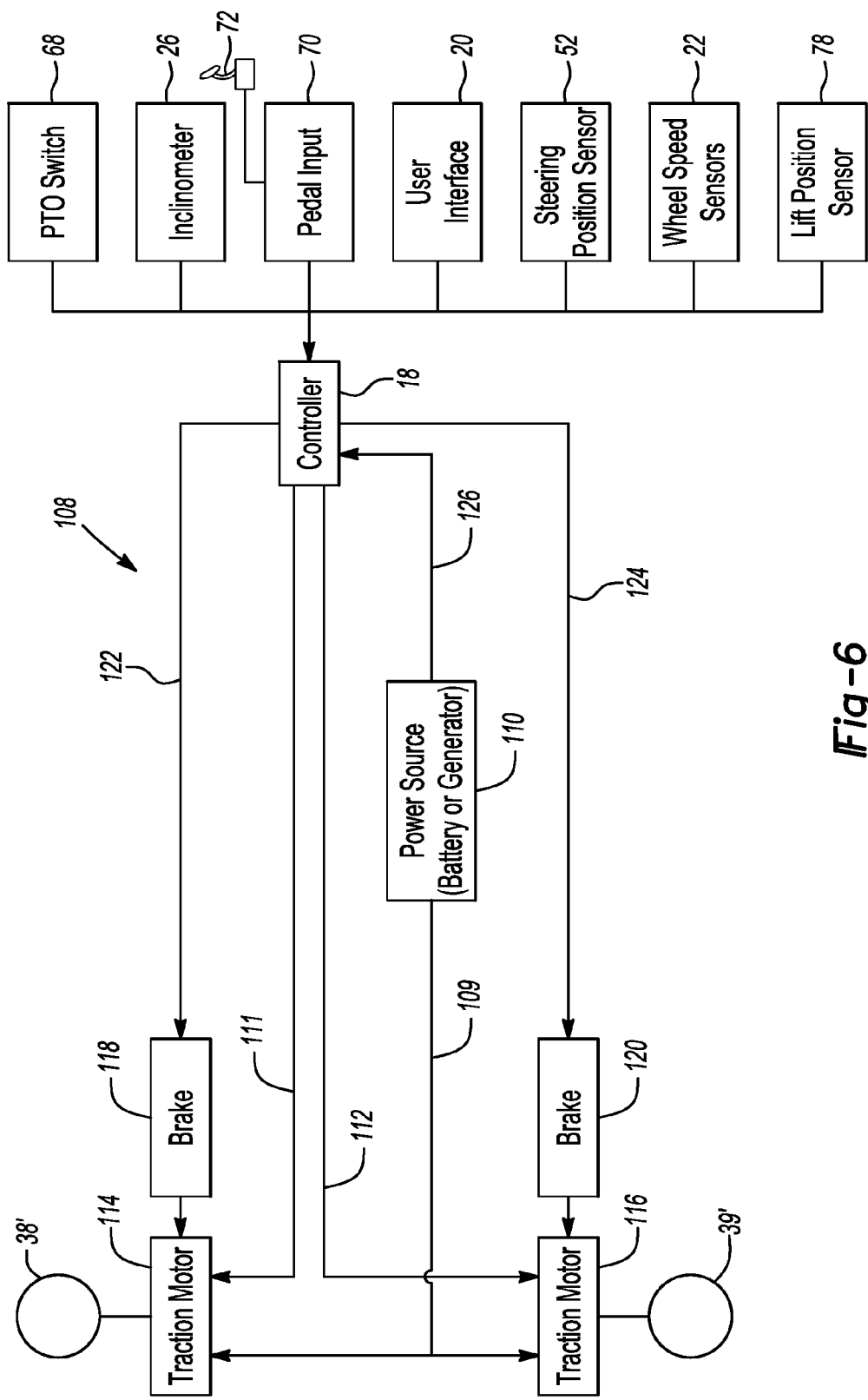

ELECTRONICALLY CONTROLLED SPEED LIMITING SYSTEM FOR TURF CARE MACHINE

FIELD

The present disclosure relates to electronic speed limiting systems for grass cutting and turf care machines.

BACKGROUND

This section provides background information related to the present disclosure which is not necessarily prior art.

Modern golf course turf care vehicles and/or equipment commonly include the capability to vary the operating speed of the vehicle to suit different operating parameters such as to vary operating speed during a mowing operation depending on grass height and terrain conditions, and to provide a higher speed for vehicle transport when mowing operations are not being performed. The need for the higher operating speed is the result of the operator's desire to reduce travel time between areas that are to be mowed or to return the vehicle to the storage/maintenance area. Systems to control vehicle speed are therefore known. Present speed control systems, however, commonly permit operation at the higher operating speed when a mowing operation is occurring, resulting in a mowing speed that is greater than is optimum. This can result in a poor cut quality. This issue has been addressed in known speed control systems by the addition of a mechanical limiting device that allows maintenance personnel to pre-set a maximum speed for each of mowing and transport. The operator determines when to activate the speed limiting device before mowing or to deactivate the device for transport. This solution therefore permits the operator to override the pre-set speed.

SUMMARY

This section provides a general summary of the disclosure, and is not a comprehensive disclosure of its full scope or all of its features.

According to several embodiments, an electronically controlled speed limiting system for a turf maintenance machine includes a first traction motor rotating a first wheel and a second traction motor rotating a second wheel. First and second wheel speed sensors are individually connected to each of the first and second wheels, each outputting an actual wheel speed signal. A controller in communication with the first and second traction motors receives the actual wheel speed signal from the first and second wheels, compares the actual wheel speed of the first and second wheels to determine if one of the wheels is rotating faster than the other wheel, and outputs a command to the faster moving one of the wheels to reduce the actual speed of the faster moving one of the wheels to equal the actual speed of the other of the wheels.

According to other embodiments, an electronically controlled speed limiting system for a turf maintenance machine includes at least one traction motor rotating at least one wheel. At least one hydraulic pump in fluid communication with the at least one traction motor provides hydraulic fluid to operate the at least one traction motor. At least one actuator in fluid communication with the at least one hydraulic pump operates to vary an output of the at least one hydraulic pump. A controller in communication with the at least one actuator provides input commands to the at least one actuator to control the output of the at least one hydraulic pump and thereby an operating speed of the at least one wheel.

According to still further embodiments, a first traction motor is rotatably connected to a first wheel and a second traction motor is rotatably connected to a second wheel. A hydraulic pump in fluid communication with both the first and second traction motors provides hydraulic fluid to operate the first and second traction motors. An actuator in communication with the hydraulic pump operates to vary an output of the hydraulic pump. A controller in communication with the actuator automatically provides input commands to the actuator to control the output of the hydraulic pump and thereby an operating speed of the first and second wheels based on one or more signals received by the controller. A first wheel speed sensor is in communication with the first wheel and a second wheel sensor is in communication with the second wheel. Output signals from the first and second wheel speed sensors are supplied to the controller and used by the controller to output a traction control signal to one of the first or second traction motors when the first or second wheel is rotating faster than the other wheel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a block diagram of an electronically controlled speed limiting system of a further embodiment.

Corresponding reference numerals indicate corresponding parts throughout the several views of the drawings.

DETAILED DESCRIPTION

Figure 1:
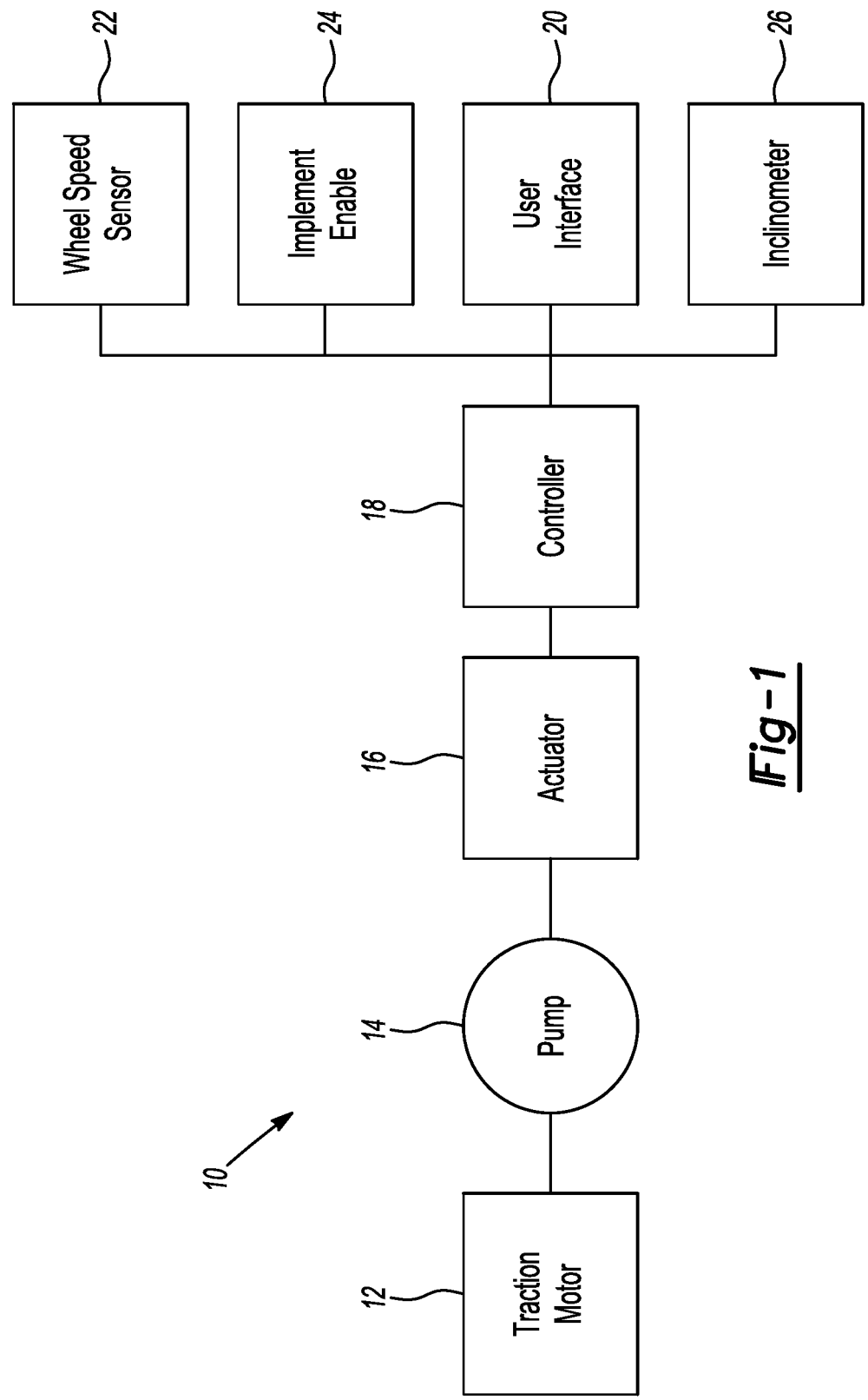
FIG. 1 is a block diagram of an electronically controlled speed limiting system for grass cutting and turf care machines of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, an electronically controlled speed limiting (ECSL) system 10 includes at least one traction motor 12 which is driven by hydraulic fluid delivered by a hydraulic pump 14. An actuator 16 such as an electro-hydraulic control unit, having for example a coil that rotates a pilot valve, controls operation of hydraulic pump 14. Actuator 16 uses sensed hydraulic pressure from hydraulic pump 14 in internal circuitry of actuator 16 to control operating speed of a mowing machine shown and described in better detail in FIG. 2, and directs hydraulic fluid flow to control forward and reverse operation of the mowing machine. Examples of hydraulic pumps and actuators suitable for use include hydraulic pumps/motors and hydraulic control units made by the Sauer-Danfoss Company of Ames, Iowa. A controller 18 is programmed to provide individual control signals for a variety of operating parameters to actuator 16. A user interface 20 such as an LCD touch-screen display, a keyboard, or similar data input device permits maintenance or programming personnel to input and lock specific control and operating commands to controller 18.

Controller 18 contains known components such as a controller board having a memory component and a microchip/microprocessor for performing various operations on the system and sensor data. Controller 18 can be provided for example by Marlin Technologies Inc. of Horicon, Wis. A computer language such as CAN communication language can be used which allows communication between controller 18 and user interface 20, and between controller 18 and other devices such as a computer or laptop for uploading new software and data for storage, as well as to download data from controller 18. Controller 18 can also include a feedback loop having a PID control algorithm using constants saved in memory for various operating conditions such as operating speed, mowing speed, inclination angle, and the like.

ECSL system 10 provides additional data input devices to communicate with controller 18. These include at least one wheel speed sensor 22 and according to several embodiments a separate wheel speed sensor for each driven wheel, which is/are connected as data input devices to controller 18 providing electronic signals representing actual measured wheel speed and therefore an actual ground speed of the mowing machine. An implement enable circuit 24 provides input to controller 18 indicating when a mowing operation is occurring. This input is used by controller 18 to automatically slow the operating speed of the mowing machine to a predetermined mowing speed to optimize the mowing operation. An inclinometer 26 provides input data to controller 18 defining an inclination of the mowing machine measured relative to a null horizontal operating orientation using at least one and according to several embodiments two planes of measurement. The data from inclinometer 26 can also be used by controller 18 to adjust actuator 16 and to thereby adjust the operating speed of the mowing machine, for example to reduce operating speed on steep inclines such as hills for improved stability.

Figure 2:
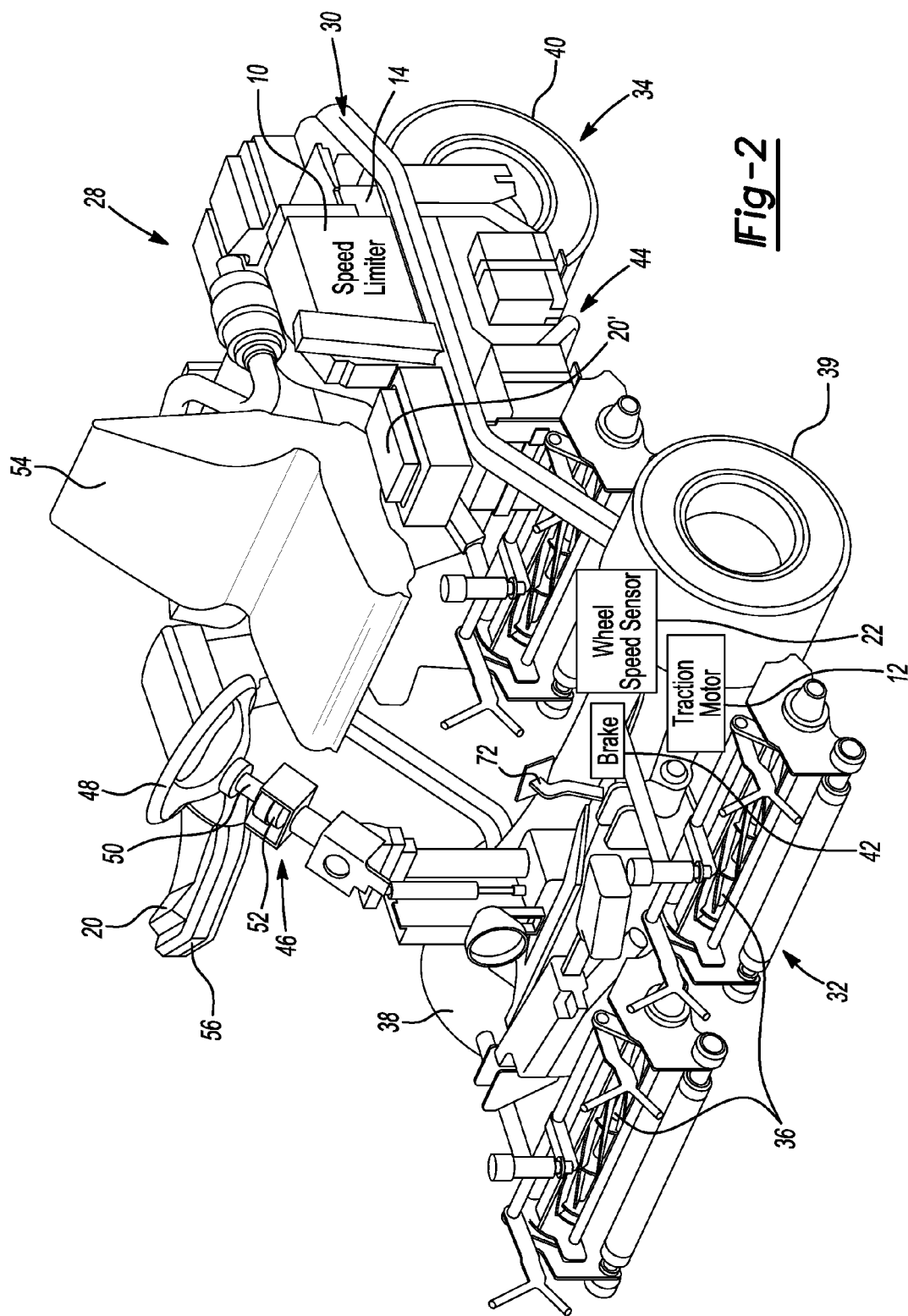
FIG. 2 is a front left perspective view of a turf care machine employing the electronically controlled speed limiting system of FIG. 1.

Referring to FIG. 2, an exemplary turf care machine 28 is illustrated in the form of a grass cutting machine employing ECSL system 10. In the embodiment shown, turf care machine 28 is a riding mower that generally includes a frame 30, a turf maintenance implement system 32, and a ground traction system generally indicated at 34. It will be understood by one skilled in the art that the teachings herein are applicable to any suitable turf maintenance vehicle, including, for instance, riding, walk-behind, and stand-behind mowers, groomers, sand rakes, aerators, utility vehicles and other turf maintenance equipment, having a power-assisted steering system.

Turf maintenance implement system 32 is supported by the frame 30 and can be of any suitable type for turf maintenance purposes. In some embodiments, the turf maintenance implement system 32 includes a plurality of implements 36 such as mowing decks or reel cutters (reel cutters are shown) for cutting grass or for other turf maintenance operations. However, it will be appreciated that the turf maintenance implement system 32 can include any suitable implement, including, for instance, mowing implements, grooming implements, raking implements, aerating implements, and other turf maintenance implements.

The ground traction system 34 supports the frame 30 and provides propulsion and steering for turf care machine 28. In the embodiment shown, the ground transportation system 34 includes first and second front wheels 38, 39, which can be individually or collectively driven to propel turf care machine 28, and a rear wheel 40, which can turn relative to the frame 30 to thereby steer turf care machine 28. Also, the ground traction system 34 includes a brake, schematically indicated at 42. The brake 42 can be of any suitable type for reducing the ground speed of turf care machine 28.

Moreover, the turf care machine 28 includes the at least one traction motor schematically indicated at 12. The one or more traction motors 12 can be used to directly power individual ones of front wheels 38, 39 or a single traction motor 12 can be used to collectively power both front wheels 38, 39. According to additional embodiments, a separate or a common traction motor 12 can also be provided to power rear wheel 40. The one or more traction motors 12 is/are hydraulically powered by pressurized hydraulic fluid delivered by hydraulic pump 14 which is powered by a power delivery system broadly referred to as engine 44. The power delivery system 44 can be of any suitable type for generating power and transmitting power to the ground traction system 34, to hydraulic pump 14 and/or the turf maintenance implement system 32. For instance, the power delivery system 44 can include an internal combustion engine for generating mechanical or electrical energy, a plurality of batteries, or a combination of the two. As such, the power delivery system 44 generates and delivers power to the ground traction system 34 to thereby propel the turf care machine 28 and to hydraulic pump 14 to operate hydraulic pump 14. Also, in one embodiment, the power delivery system 44 delivers power to the turf maintenance implement system 32 to thereby rotate the reels of implement 36.

In the embodiment shown, power delivery system 44 also includes the electronically controlled speed limiting system, generally indicated at 10. Generally speaking, a speed limit, i.e., a top speed "$V_{max}$", of turf care machine 28 is set within ECSL system 10. In various embodiments, ECSL system 10 operatively applies the actuator 16 (shown in FIG. 1) to thereby limit the power available to the ground traction system 34. Also, in various embodiments, ECSL system 10 is programmed logic that determines the amount of power delivered from the power delivery system 44 to the ground traction system 34.

Turf care machine 28 also includes a steering wheel assembly generally indicated at 46. The steering wheel assembly 46 includes a steering wheel 48, a shaft 50 extending from the steering wheel 48 and a steering wheel position sensor 52. The steering wheel position sensor 52 detects the rotated position (i.e., the steering angle) of the steering wheel 48. Also, in one embodiment, the steering wheel position sensor 52 detects a change in position of the steering wheel 48. Turf care machine 28 also includes a seat 54. The seat 54 is positioned behind the steering wheel assembly 46 and provides a place for a user to sit during operation of the turf care machine 28.

With continued reference to FIG. 2 and again to FIG. 1 a ground speed "$V_1$" of turf care machine 28 is determined from the input of one or more wheel speed sensors 22 shown in schematic form. According to several embodiments, a separate wheel speed sensor 22 is provided for each of first and second front wheels 38, 39. A desired speed "$V_2$" input signal is generated, and this input signal is transmitted and stored in controller 18. The controller 18 compares the actual ground speed "$V_1$" to the desired speed "$V_2$" and outputs a control signal to actuator 16 to change the speed limit or the ground speed of turf care machine 28 to achieve desired speed "$V_2$". The wheel speed sensors 22 can be of any suitable type. The user interface 20 for manually inputting data such as the desired speed "$V_2$" into controller 18 can be located in multiple locations, including mounted on a arm support member 56, or can be positioned proximate to seat 54 as shown by user interface 20.

Referring to FIGS. 1 and 2, the electronically controlled speed limiting system 10 functions using signals output from controller 18 which control the output of actuator 16 to manage, by throttling hydraulic flow to and also the output of, hydraulic pump 14. The controller 18 is pre-programmed with data for operation, however the pre-programmed data can be modified by data and control function input using user interface 20. The user interface 20 provides maintenance personnel the ability to set a maximum speed "$V_{max}$" of the turf care machine 28, the desired speed "$V_2$" for a specific mowing operation, as well as a rate of machine acceleration. Additionally, an input from the implement enabling circuit 24 allows controller 18 to automatically slow turf care machine 28 to a predetermined speed for different mowing operations such as to control different mowing heights. The controller 18 can also be used to limit the speed and acceleration rate of turf care machine 28 when turf care machine 28 is climbing or traversing a steep grade in order to give the operator greater control of operating speed and to minimize wheel slippage that can otherwise result in turf damage. The controller 18 can use a plurality of preset angle limits α preset, β preset and compare these to sensed inclination angle inputs α, β from inclinometer 26 to determine when to reduce an operating or real time speed "$V_1$" and an acceleration rate "AR" and how much to reduce them by. Sensed angle input α can be for example the angle of pitch (forward positive, rearward negative) of turf care machine 28 measured with respect to a horizontal reference plane. Sensed angle input β can be for example the angle of roll (right positive, left negative) of turf care machine 28 measured with respect to the horizontal reference plane.

By using wheel speed sensor 22 to measure the actual or real time ground speed "$V_1$" of turf care machine 28, controller 18 can be used to precisely control the speed of turf care machine 28. By comparing the real time ground speed "$V_1$" to a desired ground speed "$V_2$", the controller 18 can modify the output of hydraulic pump 14 via the actuator 16 until the desired ground speed "$V_2$" is obtained. The desired ground speed "$V_2$" can be a predetermined value programmed and locked in controller 18, and used for example as a set mowing speed for turf care machine 28.

Referring to FIG. 3 and again to FIG. 2, according to another embodiment an electronically controlled speed limiting ECSL system 58 uses hydraulic pump 14, actuator 16 and controller 18, together with user interface 20, wheel speed sensors 22, inclinometer 26 and steering position sensor 52. ECSL system 58 is modified from ECSL system 10 to provide for independent, direct operation of first and second traction motors 12a, 12b. First traction motor 12a independently directly controls rotation of first front wheel 38 via a first wheel hydraulic line 60 connected to hydraulic pump 14. Second traction motor 12b independently directly controls rotation of second front wheel 39 via a second wheel hydraulic line 62 connected to hydraulic pump 14 and in parallel with first wheel hydraulic line 60. The brake system of ECSL system 10 is modified in ECSL system 58 to provide first and second brakes 42a, 42b for control of first and second traction motors 12a, 12b. First brake 42a is operated by hydraulic fluid in a brake line 63 from hydraulic pump 14, and second brake 42b is operated by hydraulic fluid in a brake line 64 from hydraulic pump 14. Power output from engine 44 is used to power hydraulic pump 14. An engine throttle control 64 can be used to mechanically or electrically control a throttle position of engine 44 if engine 44 is an internal combustion engine. A signal from engine throttle control 64 can also be directed using a signal line 66 to controller 18 to provide further data input for controller 18 to apply when directing operation of actuator 16.

A power takeoff (PTO) switch 68 is also connected to controller 18 in this embodiment. PTO switch 68, when engaged, signals to controller 18 operation of an implement requiring turf care machine 28 to slow a lower speed, for example to a mowing speed. When PTO switch 68 is not engaged, a signal for a transport speed equaling the maximum speed "$V_{max}$" can be output from controller 18 to actuator 16. When a signal is received from inclinometer 26, controller 18 signals actuator 16 as required to reduce the real time ground speed "$V_1$" to an inclination ground speed "$V_3$", which can be equal to or vary from the desired ground speed "$V_2$" based on a lookup table 77 of data stored in controller 18 which can alter the inclination ground speed "$V_3$" based on the slope of the ground. Examples of data that can be stored in lookup table 77 include, but are not limited to the following. Vehicle operating speeds "$V_3$" such as 1 MPH, 2 MPH, 3 MPH 4 MPH, 5 MPH, 6 MPH, 7 MPH, 8 MPH, 9 MPH, 10 MPH can each have a corresponding set of maximum inclination angles such as $\alpha 1, \beta 1$; $\alpha 2, \beta 2$; $\alpha 3, \beta 3$; $\alpha 4, \beta 4$; $\alpha 5, \beta 5$; $\alpha 6, \beta 6$; $\alpha 7, \beta 7$; $\alpha 8, \beta 8$; $\alpha 9, \beta 9$; $\alpha 10, \beta 10$, with the inclination angles decreasing from $\alpha 1, \beta 1$ to $\alpha 10, \beta 10$ as the operating speed increases, allowing operation at higher operating speeds only to lower or zero inclination angles, while limiting operation at higher inclination angles to lower operating speeds. Similar data can be provided for the desired speeds for each given cutting operation. For example cutting operations can be established allowing different maximum cutting speeds for different cutting conditions such as rough, green apron, and fairway cutting conditions, which can be further modified for wet, dry and normal moisture conditions. Controller 18 automatically signals the individual traction motors with the required operating speed which precludes override by the operator.

Referring still to FIG. 3 and again to FIG. 2, ECSL system 58 provides a pedal input 70 which is a signal directed to controller 18 based on the position of a pedal 72 such as an accelerator pedal. The output from pedal 72 as pedal input 70 is used by controller 18 to automatically vary the speed of turf care machine 28. When controller 18 senses no output signal from pedal 72, after a predetermined period such as 3-5 seconds at the stopped condition controller 18 directs application of first and second brakes 42a, 42b via first and second brake signal lines 74, 76. The signal from controller 18 is delayed to permit time for turf care machine 28 to stop dynamically after pedal 72 is released.

As previously noted, user interface 20 permits the user to set a mowing speed such as desired speed "$V_2$" and the transport speed "$V_{max}$". Interface 20 further permits calibration of the output signal from pedal 72 to maintain consistent operation between different turf care machines. For example only, when a hard or dry ground condition is present, a higher acceleration rate "AR" can be set which does not damage the turf. When soft or wet ground conditions are present, a lower acceleration rate "AR" can be set to reduce the potential of damaging the turf from wheel slip-spin.

With continued reference to FIG. 3 and again to FIG. 2, the steering position sensor 52 outputs a signal which is based on a steering position angle of rotation of steering wheel 48 differentiating between left hand and right hand turns. Controller 18 includes a lookup table 77 which stores predetermined data including operating speeds dependent on different vehicle inclinations which is used in conjunction with inclinometer 26, and anticipated wheel speeds of first and second front wheels during turning operation including different anticipated wheel speeds for each wheel at different steering position angles, and differentiated by which wheel is the inside radial wheel or outside radial wheel in the turn. Different wheel speeds for first and second front wheels 38, 39 are desired during a turn operation to prevent wheel slip turf damage. The wheel speeds corresponding to the steering position signal from steering position sensor 52 can therefore be subtracted from the actual wheel speeds provided as output signals from the wheel speed sensors 22 for the first and second front wheels 38, 39 to determine if a slip event is occurring. The result of this operation is a correction signal generated by controller 18. The correction signal directs the actuator 16 to vary the hydraulic pressure in first and second wheel hydraulic lines 60, 62 to first and second traction motors 12a, 12b to thereby increase an operating speed of the radial outer wheel and/or decrease the operating speed of the radial inner wheel during the turn. The correction signal therefore maintains an overall operating speed of turf care machine 28 to maintain the desired mowing speed during the turn without wheel slip. A signal from the wheel speed sensors 22 to controller 18 indicating turf care machine 28 is in the stopped condition will generate a vehicle stopped signal which directs application of the first and second brakes 42a, 42b via first and second brake signal lines 74, 76, which open or close hydraulic control valves of first and second brakes 42a, 42b to apply hydraulic pressure from first and second brake lines 63, 64 to apply or release brake pressure.

ECSL system 58 also includes a lift position sensor 78 which senses a raised (non-operating) or lowered (operating) position of the cutting units 36. Upon receipt of the signal from lift position sensor 78, controller 18 will automatically decrease the operating speed of turf care machine 28 if the cutting units 36 are in the lowered position, and will permit increased operating speed up to the maximum operating speed "$V_{max}$" if the cutting units 36 are in the raised position. A password 79 entered into the user interface 20 locks/unlocks data entered and stored in controller 18 to prevent operator override of the automatic operation features of ECSL system 58.

Figure 3:
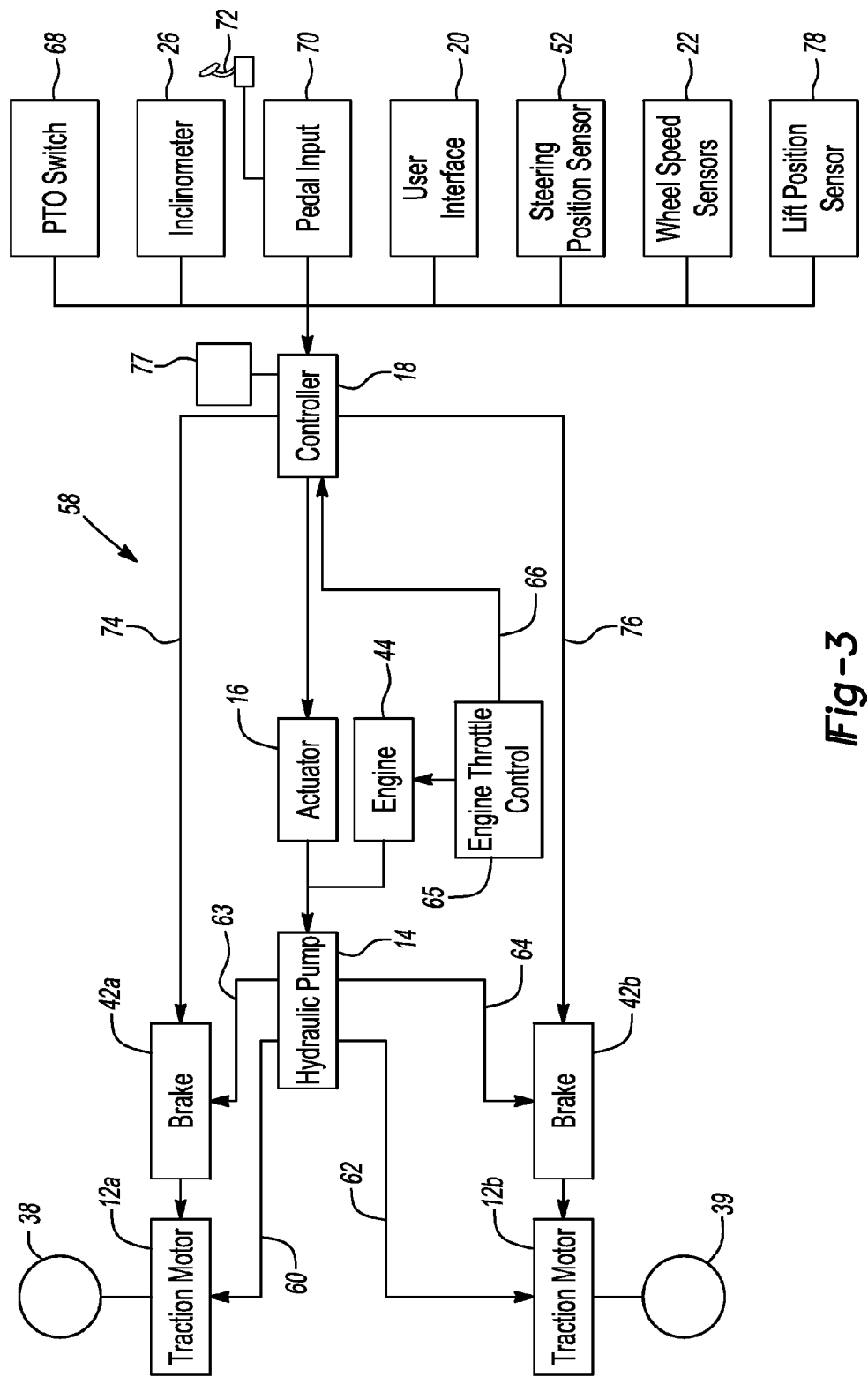
FIG. 3 is a block diagram of an electronically controlled speed limiting system of another embodiment.
Figure 4:
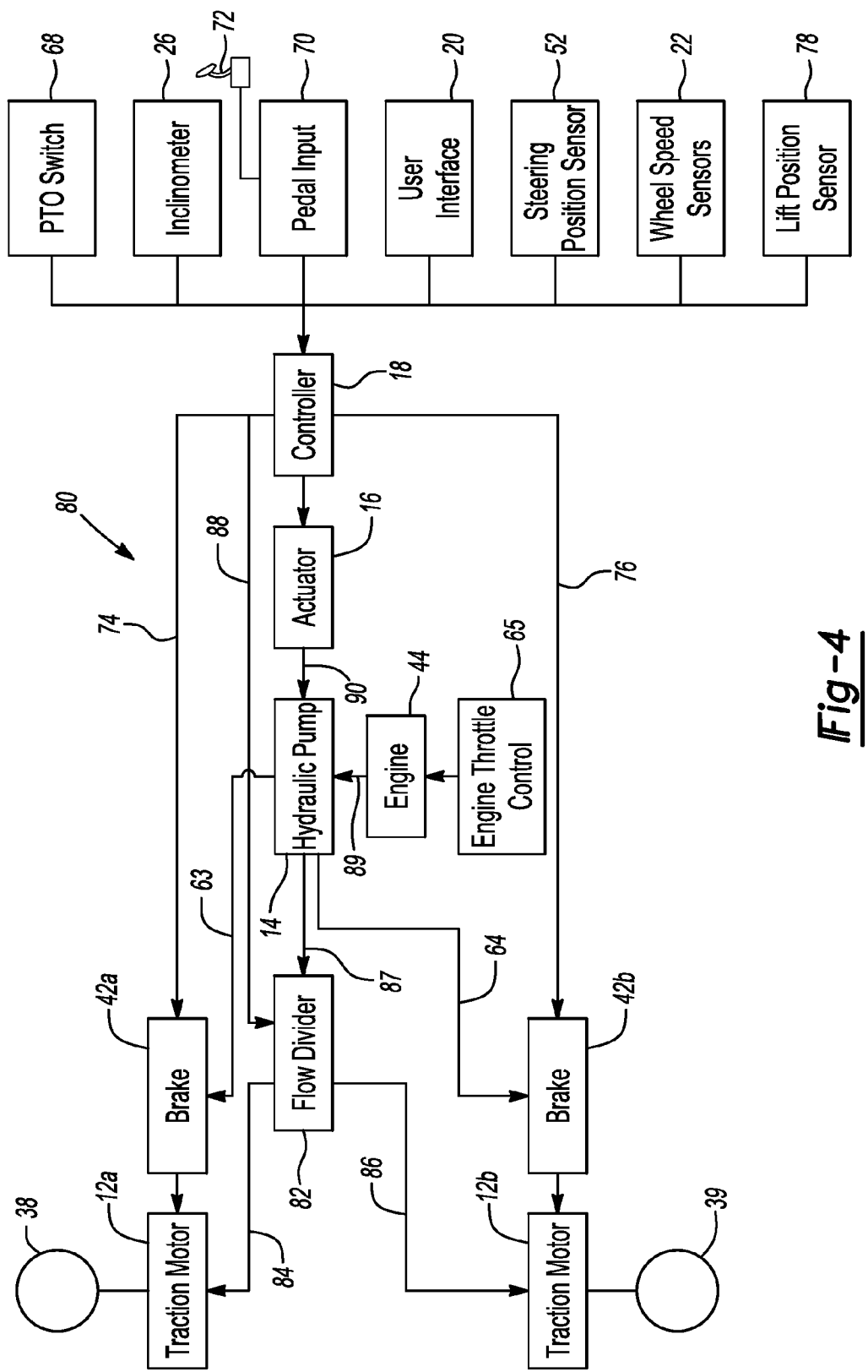
FIG. 4 is a block diagram of an electronically controlled speed limiting system of another embodiment having a first traction control option.

Referring to FIG. 4 and again to FIGS. 2 and 3, according to another embodiment an electronically controlled speed limiting ECSL system 80 provides for a first traction control option and includes the features of ECSL system 58, but is further modified to provide for operation of first and second traction motors 12a, 12b through the additional use of a flow divider 82 communicating directly between the hydraulic pump 14 and the first and second traction motors 12a, 12b. Flow divider 82 communicates directly to first traction motor 12a via a first hydraulic control line 84. Flow divider 82 communicates directly to second traction motor 12b via a second hydraulic control line 86. Flow divider 82 permits a limited slip traction control for first and second front wheels 38, 39.

ECSL system 80 also differs from ECSL system 58 by providing hydraulic flow line 87 directly between hydraulic pump 14 and flow divider 82, and further provides a flow divider signal line 88 which directs internal operation of flow ports within flow divider 82 to individually control the flow of hydraulic fluid to first and second traction motors 12a, 12b to provide for individual control of wheel speed for wheels 38, 39. A directly connected input line 89 is provided between engine 44 and hydraulic pump 14, and a directly connected actuator output line 90 connects actuator 16 and hydraulic pump 90. Signals from wheel speed sensors 22 are used to determine if first or second front wheel 38, 39 is slip-spinning, which may be indicated when first or second front wheel 38, 39 is rotating faster than the other wheel. In this condition, controller 18 supplies a traction control signal to apply brake 42a or 42b for the wheel which is rotating faster to provide traction control. The steering position signal from steering position sensor 52 is also applied by controller 18 to differentiate a wheel slip event from the anticipated difference in wheel rotation speed between first and second front wheels 38, 39 while making a turn. A wheel rotation speed of first or second front wheel 38, 39 that is above a pre-determined value saved in controller 18 for speed differences during normal turning events triggers the traction control signal.

Figure 5:
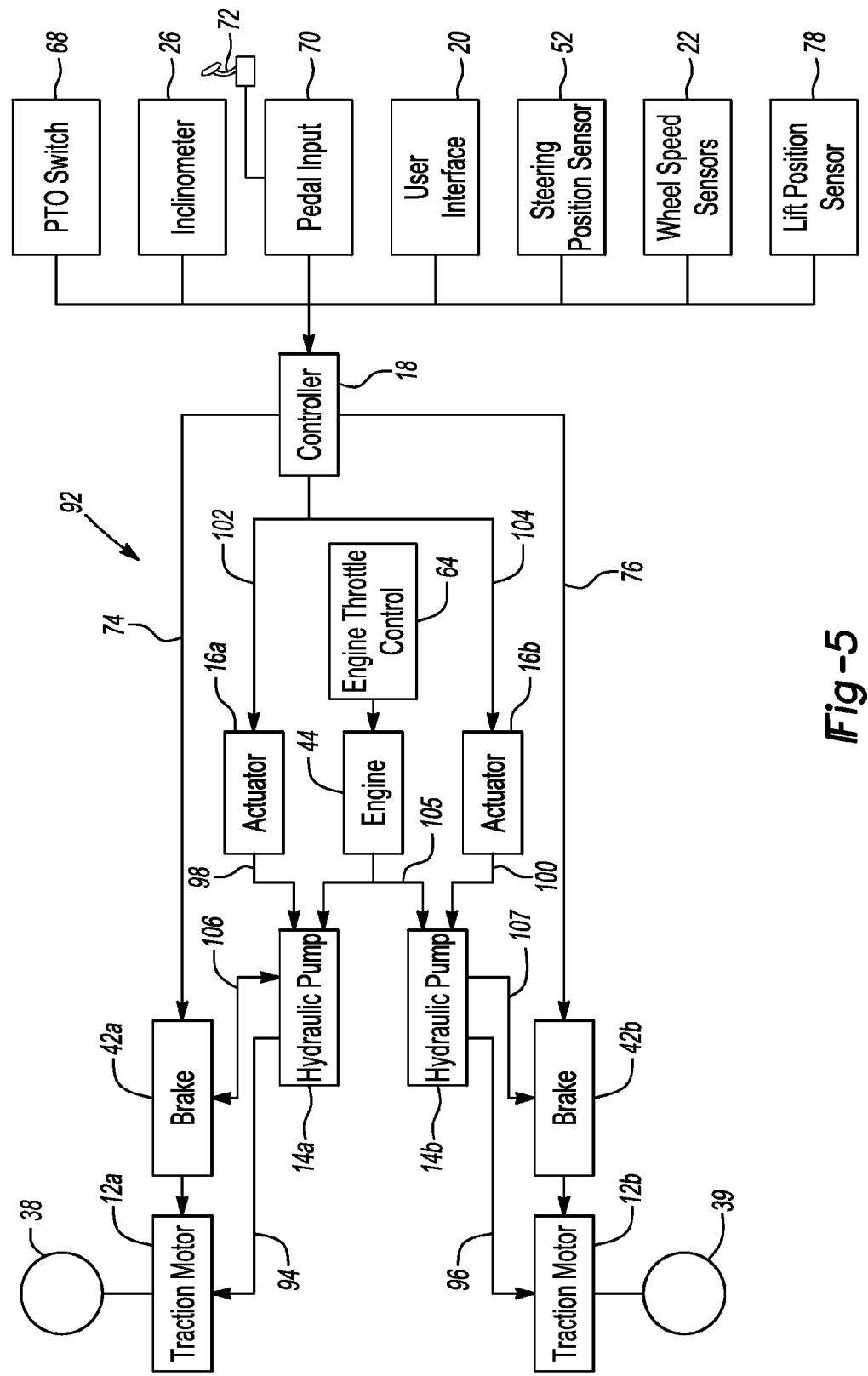
FIG. 5 is a block diagram of an electronically controlled speed limiting system of another embodiment having a second traction control option.

Referring to FIG. 5 and again to FIGS. 2 and 3, according to another embodiment, an electronically controlled speed limiting ECSL system 92 provides for a second traction control option and includes the features of ECSL system 58, but is further modified to provide for independent operation of first and second traction motors 12a, 12b through the use of separate actuators and hydraulic pumps for each of the first and second traction control motors 12a, 12b. ECSL system 92 includes a first hydraulic pump 14a connected to first traction motor 12a by a first traction motor hydraulic line 94. A second hydraulic pump 14b is connected to second traction motor 12b by a second traction motor hydraulic line 96. A first actuator 16a is connected to first hydraulic pump 14a by a first actuator output line 98. A second actuator 16b is connected to second hydraulic pump 14b by a second actuator output line 100. Controller 18 communicates with first and second actuators 16a, 16b via parallel controller signal lines 102, 104. An output from engine 44 is commonly applied to first and second hydraulic pumps 14a, 14b via common output line 105.

Wheel speed signals from first and second wheel speed sensors 22a, 22b are used to determine if first or second front wheel 38, 39 is slipping, which is indicated in a non-turning operation when first or second front wheel 38, 39 is rotating faster than the other wheel. In this condition, controller 18 supplies a traction control signal to either first or second actuator 16a, 16b for the wheel which is rotating faster to reduce the output flow from either first or second hydraulic pump 14a, 14b to the faster rotating wheel, thereby reducing the wheel rotation speed to provide traction control. Similar to ECSL system 58 the steering position signal from steering position sensor 52 is also applied by controller 18 to differentiate a wheel slip event from the anticipated difference in wheel rotation speed between first and second front wheels 38, 39 while making a turn. A wheel rotation speed of first or second front wheel 38, 39 that is above a pre-determined value saved in controller 18 for rotation speed differences during normal turning events triggers the traction control signal. First and second hydraulic brake lines 106, 107 from each of the first and second hydraulic pumps 14a, 14b provide hydraulic fluid to first and second brakes 42a, 42b.

Referring to FIG. 6, and again to FIGS. 2 and 3, according to another embodiment, an electronically controlled speed limiting ECSL system 108 provides electric power via a power transfer line 109 from a power source 110 such as a battery unit or a generator to provide both drive power and automatic electronic traction control for first and second wheels 38', 39' by separate first and second command signal lines 111, 112 from controller 18. First and second wheels 38', 39' are individually driven by first and second electrically powered first and second traction motors 114, 116 which receive power via power transfer line 109. First and second command signal lines 111, 112 are connected to first and second traction motors 114, 116. Electrically powered first and second brakes 118, 120 are individually connected to one of the first and second traction motors 114, 116. A first brake signal line 122 provides braking signals from controller 18 to first brake 118. A second brake signal line 124 provides braking signals from controller 18 to second brake 120. Power source 110 is in communication with controller 18 via a communication line 126 providing power to controller 18.

Similar to the previous embodiments, signals from wheel speed sensors 22 are used to determine if first or second front wheel 38', 39' is slipping, which is indicated when first or second front wheel 38', 39' is rotating faster than the other wheel. In this condition, controller 18 supplies a traction control signal to either first or second traction motor 114, 116 via either first or second command signal lines 111, 112 for the wheel which is rotating faster to reduce the operating speed either first or second traction motor 114, 116 to the faster rotating wheel, thereby reducing the wheel rotation speed to eliminate wheel slip and provide traction control. Similar to ECSL system 58 the steering position signal from steering position sensor 52 can also be applied by controller 18 to differentiate a wheel slip event from the anticipated difference in wheel rotation speed between first and second front wheels 38', 39' while making a turn. A wheel rotation speed of first or second front wheel 38', 39' that is above a pre-determined value saved in controller 18 for rotational speed differences during normal turning events triggers the traction control signal. First and second brake signal lines 122, 124 from controller 18 provide operating signals to the first and second brakes 118, 120 when signals from the wheel speed sensors 122 both indicate the vehicle is in a stopped condition. The first and second brakes 118, 120 operate after a predetermined period of indication from wheel speed sensors 122 of zero wheel rotation speed to provide a machine parked condition.

The speed limiting systems of the present disclosure offer several advantages. Speed control using the controller of the present disclosure allows maintenance personnel to limit a maximum speed for each of the mowing and transport conditions. The controller provides for automatic engagement of the different speeds, and permits additional system input such as determination of operation during precarious conditions such as operation on an incline, or when climbing or descending a steep grade. The additional system input provides for additional automatic control of the operating speed. The automatic control conditions can be locked preventing modification by the operator. The use of the controller signaling an actuator to manage an output of a hydraulic pump for controlling vehicle speed provides an automatically operating system that precludes manual manipulation of predetermined operating speeds, thereby providing repeatable operating conditions for operations such as mowing or rapid travel during non-mowing operations.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An electronically controlled speed limiting system for a turf maintenance machine, comprising:
a first traction motor directly rotating a first wheel and a second traction motor directly rotating a second wheel;
first and second wheel speed sensors individually connected to each of the first and second wheels, each outputting an actual wheel speed signal;
a controller in communication with the first and second traction motors receiving the actual wheel speed signal from the first and second wheels, operating to compare the actual wheel speed of the first and second wheels to determine if one of the wheels is rotating faster than the other wheel, a command output from the controller to the faster rotating one of the wheels operates to reduce the actual speed of the faster moving one of the wheels to equal the actual speed of the other of the wheels, the controller further including a lookup table having recommended operating speeds for a plurality of different inclination angles of the turf maintenance machine; and
an inclinometer operating to sense an angle of inclination of the turf maintenance machine and create an inclinometer signal corresponding to the angle of inclination;
wherein the inclinometer signal is compared in the controller to the plurality of preset inclination angles in the lookup table, and a speed reduction command is generated by the controller used to reduce an operating speed of the turf maintenance machine to the one of the recommended operating speeds corresponding to the angle of inclination.

2. The electronically controlled speed limiting system of claim 1, further including at least one hydraulic pump in direct fluid communication with the at least one traction motor providing hydraulic fluid to operate the first and second traction motors.

3. The electronically controlled speed limiting system of claim 2, further including at least one actuator in fluid communication with the at least one hydraulic pump operating to vary an output of the at least one hydraulic pump.

4. The electronically controlled speed limiting system of claim 3, further including a steering position sensor outputting a steering sensor signal which is based on a steering position angle of rotation of a steering wheel, the steering sensor signal being compared in a lookup table saved in the controller to the actual wheel speed signals from the wheel speed sensors, and when an actual speed of one of the first and second wheels exceeds a predetermined speed found in the lookup table for an anticipated wheel speed during a vehicle turn based on the steering sensor signal, a traction control signal is forwarded by the controller to one of the first and second traction motors to thereby decrease an operating speed of the first or second wheel which is slipping.

5. The electronically controlled speed limiting system of claim 2 further including a first brake operating to resist rotation of the first wheel and a second brake operating to resist rotation of the second wheel, actuation of one or both of the first and second brakes controlled by a brake signal from the controller.

6. The electronically controlled speed limiting system of claim 5, wherein the brake signal is sent from the controller to the first or second traction motor for the faster rotating one of the wheels to reduce an operating speed of the first or second traction motor for the faster rotating one of the wheels.

7. An electronically controlled speed limiting system for a turf maintenance machine, comprising:
at least one traction motor rotating at least one wheel;
at least one hydraulic pump in fluid communication with the at least one traction motor providing hydraulic fluid to operate the at least one traction motor;
at least one actuator in fluid communication with the at least one hydraulic pump operating to vary an output of the at least one hydraulic pump;
a controller in communication with the at least one actuator providing input commands to the at least one actuator to control the output of the at least one hydraulic pump and thereby an operating speed of the at least one wheel, the controller further including a lookup table having recommended operating speeds for a plurality of different inclination angles of the turf maintenance machine; and
an inclinometer operating to sense an angle of inclination of the turf maintenance machine and create an inclinometer signal corresponding to the angle of inclination;
wherein the inclinometer signal is compared in the controller to the plurality of preset inclination angles in the lookup table, and a speed reduction command is generated by the controller used to reduce an operating speed of the turf maintenance machine to the one of the recommended operating speeds corresponding to the angle of inclination.

8. The electronically controlled speed limiting system of claim 7, wherein the at least one traction motor includes first and second traction motors and wherein the at least one wheel includes first and second wheels, the first traction motor driving the first wheel and the second traction motor driving the second wheel.

9. The electronically controlled speed limiting system of claim 8, further including first and second wheel speed sensors, the first wheel speed sensor sensing an operating speed of the first wheel and the second wheel speed sensor sensing an operating speed of the second wheel.

10. The electronically controlled speed limiting system of claim 9, further including a wheel speed signal received from each of the first and second wheel speed sensors, the controller operating to compare the wheel speed signals to determine if the first or second wheel is slipping, indicated when the first or second wheel is rotating faster than the other wheel, and output a traction control signal to apply a brake for the faster rotating wheel to equalize the wheel speed of the first and second wheels.

11. The electronically controlled speed limiting system of claim 8, wherein the at least one hydraulic pump includes first and second hydraulic pumps, each in communication with and operating one of the first and second traction motors.

12. The electronically controlled speed limiting system of claim 11, wherein the at least one actuator includes first and second actuators, the first actuator in communication with the first hydraulic pump and the second actuator in communication with the second hydraulic pump.

13. The electronically controlled speed limiting system of claim 7, further including a user interface in communication with the controller for inputting operating commands to be stored in the controller, the operating commands capable of being locked by a user determined password to prevent machine operator modification.

14. The electronically controlled speed limiting system of claim 7, further including a wheel speed sensor measuring an actual speed of the at least one wheel, an output signal from the wheel speed sensor communicated to the controller, the controller operating to compare the actual speed of the first wheel to a desired speed of the first wheel and to output a signal to the at least one actuator to automatically modify the output of the at least one hydraulic pump and thereby the operating speed of the at least one traction motor to match the actual speed to the desired speed.

15. The electronically controlled speed limiting system of claim 8, further including a flow divider positioned between the at least one hydraulic pump and the first and second traction motors, the flow divider in communication with the controller such that a signal to the flow divider from the controller varies a flow rate of hydraulic fluid to each of the first and second traction motors.

16. An electronically controlled speed limiting system for a turf maintenance machine, comprising:
 a first traction motor rotatably connected to a first wheel and a second traction motor rotatably connected to a second wheel;
 a hydraulic pump in fluid communication with both the first and second traction motors providing hydraulic fluid to operate the first and second traction motors;
 an actuator in communication with the hydraulic pump operating to vary an output of the hydraulic pump;
 a controller in communication with the actuator automatically providing input commands to the actuator to control the output of the hydraulic pump and thereby an operating speed of the first and second wheels based on one or more signals received by the controller;
 a first wheel speed sensor in communication with the first wheel and a second wheel sensor in communication with the second wheel, output signals from the first and second wheel speed sensors supplied to the controller and used by the controller to output a traction control signal to one of the first or second traction motors when the first or second wheel is rotating faster than the other wheel; and
 an inclinometer operating to sense an angle of inclination of the turf maintenance machine and create an inclinometer signal corresponding to the angle of inclination;
 wherein the inclinometer signal is compared in the controller to a plurality of different inclination angles in a lookup table each having a recommended vehicle operating speed, and a speed reduction command is generated by the controller used to reduce an operating speed of the first and second traction motors during operation at the angle of inclination.

17. The electronically controlled speed limiting system of claim 16, further including a steering position sensor outputting a steering sensor signal based on a steering position angle of rotation of a machine steering wheel.

18. The electronically controlled speed limiting system of claim 17, wherein the steering sensor signal is compared in a lookup table saved in the controller to the actual wheel speed signals from the wheel speed sensors, and when an actual speed of one of the first and second wheels exceeds a predetermined speed found in the lookup table for an anticipated wheel speed during a vehicle turn, a traction control signal generated by the controller is forwarded to one of the first and second traction motors to thereby decrease an operating speed of the first or second wheel which is slipping.

19. The electronically controlled speed limiting system of claim 16, further including a flow divider in fluid communication with and positioned between the hydraulic pump and the first and second traction motors, the flow divider in communication with the controller such that a signal to the flow divider from the controller operates to vary an individual flow rate of hydraulic fluid from the flow divider to each of the first and second traction motors.

20. The electronically controlled speed limiting system of claim 16, further including a pedal input in communication with the controller providing indication of an accelerator pedal position, a signal of the pedal input being used by the controller to vary a speed of both the first and second traction motors.

21. The electronically controlled speed limiting system of claim 16, further including a power takeoff switch in communication with the controller, the power takeoff switch in an engaged position signaling to the controller a lowered operating position of an implement, a lowered operating position signal sent by the controller to the actuator to automatically reduce an operating speed of the turf maintenance machine for implement operation and to preclude operation of the turf maintenance machine at a higher transfer speed.

22. The electronically controlled speed limiting system of claim 16, further including a user interface, the user interface providing for manual input into the controller of a maximum speed of the turf care machine, a desired speed for a specific mowing operation, and a rate of machine acceleration.

* * * * *